(12) United States Patent
Drinkrow

(10) Patent No.: US 7,036,849 B2
(45) Date of Patent: May 2, 2006

(54) STOP DEVICE

(76) Inventor: Richard Johannes Drinkrow, 43 Milkwood Crescent, Jakaranda Park, 7460 Tygerdal (ZA)

( * ) Notice: Subject to any disclaimer, the term of this patent is extended or adjusted under 35 U.S.C. 154(b) by 209 days.

(21) Appl. No.: 10/416,686

(22) PCT Filed: Nov. 7, 2001

(86) PCT No.: PCT/IB01/02083

§ 371 (c)(1),
(2), (4) Date: May 12, 2003

(87) PCT Pub. No.: WO02/38420

PCT Pub. Date: May 16, 2002

(65) Prior Publication Data

US 2004/0026555 A1 Feb. 12, 2004

(30) Foreign Application Priority Data

Nov. 13, 2000 (ZA) .................................. 2000/6554

(51) Int. Cl.
*B60R 22/00* (2006.01)
(52) U.S. Cl. .................................................. 280/801.1
(58) Field of Classification Search ............. 280/801.1; 74/468, 478, 479, 480
See application file for complete search history.

(56) References Cited

U.S. PATENT DOCUMENTS

| 3,646,644 A | 3/1972 | Watts |
| 4,371,192 A | 2/1983 | Alix |
| 4,726,625 A | 2/1988 | Bougher |
| 5,160,167 A | 11/1992 | Fourrey et al. |
| 5,350,196 A | 9/1994 | Atkins |
| 5,692,806 A | 12/1997 | Jones |
| 6,050,647 A | 4/2000 | Thompson |

*Primary Examiner*—Faye M. Fleming
(74) *Attorney, Agent, or Firm*—Schmeiser, Olsen & Watts

(57) ABSTRACT

The invention discloses a method and device for releasably gripping an inertia reel seatbelt provided in a motor vehicle. The device includes a body adapted to be spatially movable along a seatbelt, relative to both the seatbelt and the motor vehicle to which the seatbelt is fitted. A gripping member is pivotally joined to the body so that an opening is formed between the body and the gripping member for receiving the seatbelt. A locking formation is associated with the body and the gripping member, and has associated first and second oppositely facing locking members, the first locking member being provided on the body and the second locking member being provided on the gripping member. The first and second locking members are adapted to releasably lockingly engage the seatbelt to prevent spatial movement of the body relative to the seatbelt, while allowing spatial movement of the body relative to the motor vehicle.

16 Claims, 4 Drawing Sheets

STOP DEVICE

FIELD OF INVENTION

The present invention relates to a stop device.

More particularly, the present invention relates to a stop device for an inertia reel seatbelt in a motor vehicle.

BACKGROUND TO INVENTION

Many modern motor vehicles are provided with inertia reel seatbelts. Such seatbelts automatically take up any slack in the seatbelt, thereby pulling it flush against a person's body. This has an advantage in that the seatbelts automatically adjust to the correct size settings for different size people.

However, in certain circumstances an inertia reel seatbelt may cause discomfort. This is especially prevalent amongst women as the seatbelt often presses against their breasts. Also, pregnant women do not like any pressure being applied to their abdomen. The discomfort may also extend to men who have large torsos or to any person who has an injury that would be pressed by the seatbelt, e.g. a broken collar bone or chest pains.

For these reasons, many people drive without using a seatbelt. This is dangerous, especially if the person is involved in a motor vehicle accident.

It is known to provide a seatbelt retaining element for inhibiting an inertia reel seatbelt from rewinding. Such element is attached to a part of the motor vehicle, e.g. a seatbelt guide and has a clip for frictionally gripping the seatbelt in a desired location. This element has a disadvantage in that it cannot be used in modern vehicles, in which the seatbelt is provided inside the motor vehicle framework, e.g. a doorpost. Thus there is no seatbelt guide to which it can be attached. Furthermore, when a person leans forward, thereby extending the seatbelt, the clip automatically releases. Thus the person then has to re-secure the clip when he leans backward. This can be dangerous if this happens while the person is driving as his attention is distracted from the road.

It is an object of the invention to suggest a stop device, which will assist in overcoming these problems.

SUMMARY OF INVENTION

According to the invention a stop device for releasably gripping an inertia reel seatbelt provided in a motor vehicle, includes
a) a body adapted to be spatially movable along a seatbelt, the body being movable relative to the seatbelt and the motor vehicle to which the seatbelt is fitted;
b) a gripping member pivotally joined to the body so that an opening is formed between the body and the gripping member, which opening is adapted to receive the seatbelt; and
c) a locking formation associated with the body and the gripping member, the locking formation having associated first and second oppositely facing locking members, the first locking member being provided on the body and the second locking member being provided on the gripping member, the first and second locking members being adapted to releasably lockingly engage the seatbelt to prevent spatial movement of the body relative to the seatbelt, while allowing spatial movement of the body relative to the motor vehicle.

The stop device may be adapted to allow further extraction or retraction of a seatbelt fitted to a motor vehicle without allowing the seatbelt from being retracted beyond a desired position at which the body is engaged to the seatbelt.

The stop device may be adapted to abut against a seatbelt guide or a doorpost of a motor vehicle, thereby preventing a seatbelt from being further retracted by an inertia reel retractor.

The locking formation may be adapted to flex the seatbelt into an S-shape when the locking formation lockingly engages the seatbelt.

The locking formation may be adapted to flex the seatbelt through at least 90° when the locking formation lockingly engages the seatbelt.

The gripping member may be adapted to be pivoted between an open configuration, in which a seatbelt is movably located in the opening, and a closed configuration, in which a seatbelt is immovably located in the opening.

The gripping member may be adapted to be pivoted into the open configuration by tensioning a seatbelt within the opening.

Pegs may be provided on the gripping member and associated bores may be provided in the body, the pegs and bores being adapted to pivotally join the gripping member to the body.

The body may be provided with ramps leading into the bores along which ramps the pegs can slide for easy insertion into the bores.

The stop device may be adapted to be relatively easily installed on an existing seatbelt by positioning the body and the gripping member on opposite sides of the seatbelt and pressing the body and gripping member together so that the pegs slidingly engage with the ramps and enter the bores.

The first and second locking members may be triangular in side view, so that in operation a seatbelt is engaged by tooth-like ridges.

Also according to the invention, a stop device for releasably gripping an inertia reel seatbelt located in a motor vehicle, includes a body adapted to be spatially movable along a seatbelt; a gripping member swivelably joined to the body and on operation adapted to removably lock the body to a seatbelt to provide a stop preventing rewinding of the seatbelt; and an opening formed between the body and the gripping member, which opening is adapted to locate a seatbelt.

The stop device may be adapted to allow further unwinding or rewinding of a seatbelt without allowing the seatbelt from being rewound beyond a desired position at which the body is locked to the seatbelt.

The stop device may be adapted to abut against a seatbelt guide or a doorpost of a motor vehicle, thereby preventing a seatbelt from being further rewound by an inertia reel.

The gripping member may be adapted to be swivelled between an open configuration, in which the seatbelt is movably located in the opening, and a closed configuration, in which the seatbelt is immovably located in the opening.

The stop device may include oppositely facing first and second lips, the first lip being provided on the body and the second lip being provided on the gripping member, the lips being adapted to engage a seatbelt when the gripping member is located in the closed configuration.

The gripping member may be swivelled into the open configuration by tensioning a seatbelt within the opening.

The stop device may be used on any suitable inertia reel seatbelt, e.g. front or rear seatbelts, as it does not require attachment to any part of a motor vehicle body.

The stop device may be made of a suitable plastics material, such as polyethylene, polypropylene, acetyl or reinforced nylon.

The stop device may be manufactured of plastics material by injection moulding.

Further according to the invention, a safety arrangement for installation in a motor vehicle includes in combination a stop device as set out herein and a seatbelt withdrawably contained in a retracted condition in an inertia reel retractor, the retractor being adapted to bias the seatbelt into its retracted condition.

The invention also extends to a motor vehicle provided with a safety arrangement as set out herein.

Still further according to the invention, a method of controlling retraction of an inertia reel seatbelt provided in a motor vehicle includes the steps of providing regulation means slidably mounted on the seatbelt; of extracting the seatbelt to a length of suitable extent; of lockingly engaging the regulation means against the seatbelt to prevent the seatbelt from being retracted to a length less than the suitable extent, while allowing further extraction or retraction of the seatbelt to a length greater than the suitable extent; and, when required, of releasing the regulation means to allow complete retraction of the seatbelt.

The method may include the step of tensioning the seatbelt within the regulation means in order to release the regulation means.

The regulation means may be a stop device as set out herein.

The stop device may be installed on a seatbelt by positioning the body and the gripping member on opposite sides of the seatbelt and pressing the body and gripping member together to pivotally join the gripping member to the body.

The gripping member may be pivoted to cause the locking formation to lockingly engage with the seatbelt and in which the seatbelt may be tensioned within the stop device to disengage the locking formation from the seatbelt.

BRIEF DESCRIPTION OF DRAWINGS

The invention will now be described by way of example with reference to the accompanying schematic drawings.

In the drawings there is shown in.

DETAILED DESCRIPTION OF DRAWINGS

Figure 1:
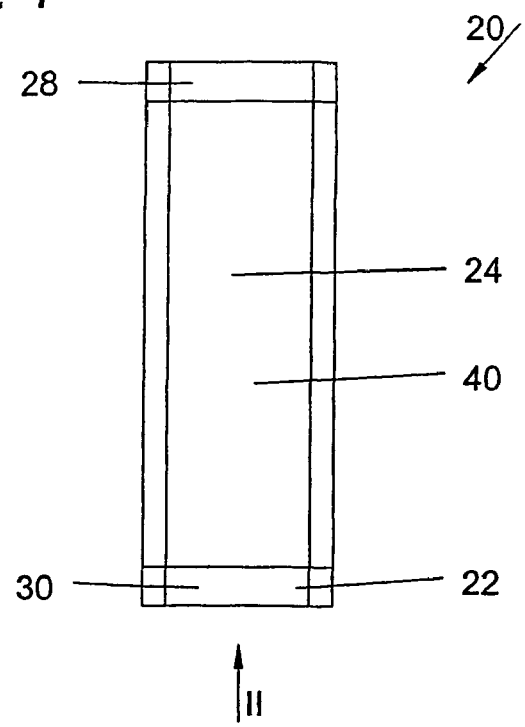
FIG. 1 a plan view of a stop device for use in relation to a seatbelt in accordance with the invention.
Figure 2:
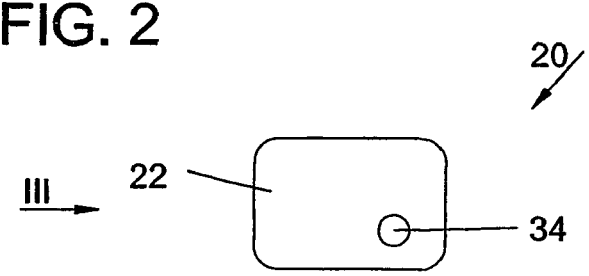
FIG. 2 a side view seen along arrow II in FIG. 1.
Figure 3:
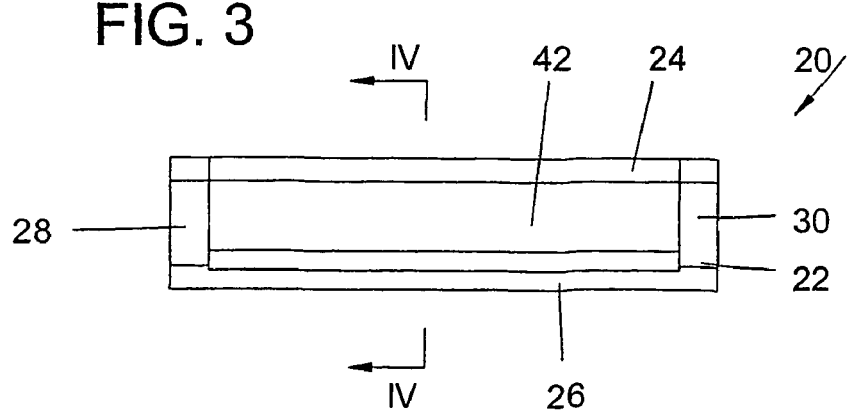
FIG. 3 an end view seen along arrow III in FIG. 2.

Referring to FIGS. 1 to 6, a stop device in accordance with the invention, generally indicated by reference numeral 20, is shown. The device 20 includes a body 22 and a gripping member 24 swivelably joined to the body 22.

The body 22 includes a base 26 having two side walls 28,30 extending substantially at right angles thereto at its outer ends. Two co-axial bores 32,34 and wedge shaped cut-outs or ramps 32.1,34.1 are respectively provided in each of the side walls 28,30. A longitudinal ridge 36 protrudes from the base 26 and extends from the side wall 28 to the side wall 30. The ridge 36 is provided with a first lip 38.

The gripping member 24 is substantially L-shaped in side view, having a first leg 40 and a second leg 42. The first leg 40 has two bent off ends 44,46, which project from the first leg 40 in a direction similar to the second leg 42. Each bent off end 44,46 is provided with an outwardly projecting peg 48,50, which is adapted to be swivelably secured in the bores 32,34 respectively. The second leg 42 includes an inwardly projecting second lip 52.

Figure 4:
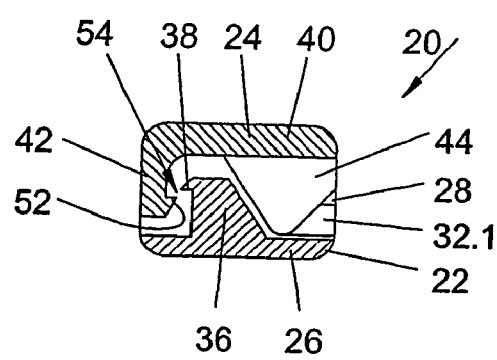
FIG. 4 a sectional side view seen along arrows IV—IV in FIG. 3.

When the device 20 is in a closed configuration (as shown in FIG. 4), the gripping member 24 is swivelled so that the second lip 52 is spaced away from and below the first lip 38, thereby forming a relatively small opening 54 between the first lip 38 and the second lip 52.

Figure 5:
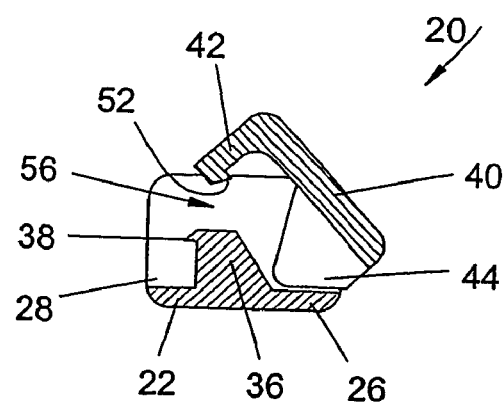
FIG. 5 a sectional side view corresponding to FIG. 4 with the stop device shown in an open configuration.
Figure 6:
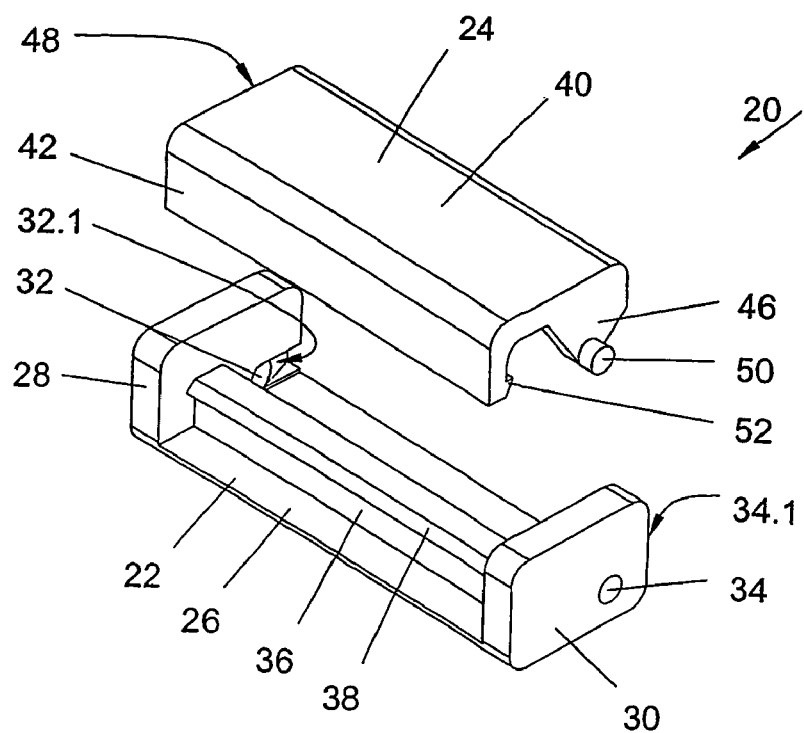
FIG. 6 an exploded perspective view of the stop device.

When the device 20 is in an open configuration (as shown in FIG. 5), the gripping member 24 is swivelled so that the second lip 52 is spaced away from and above the first lip 38, thereby forming a relatively larger opening 56 between the first lip 38 and the second lip 52.

Figure 7:
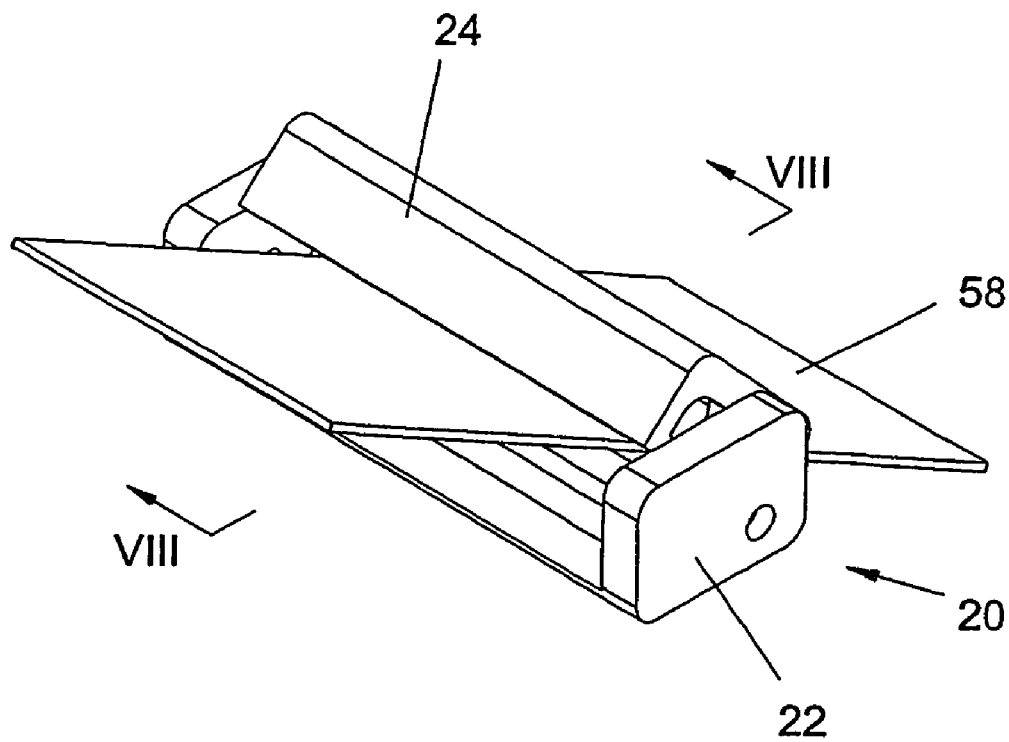
FIG. 7 a perspective view of the stop device shown provided on a seatbelt in an open configuration.
Figure 8:
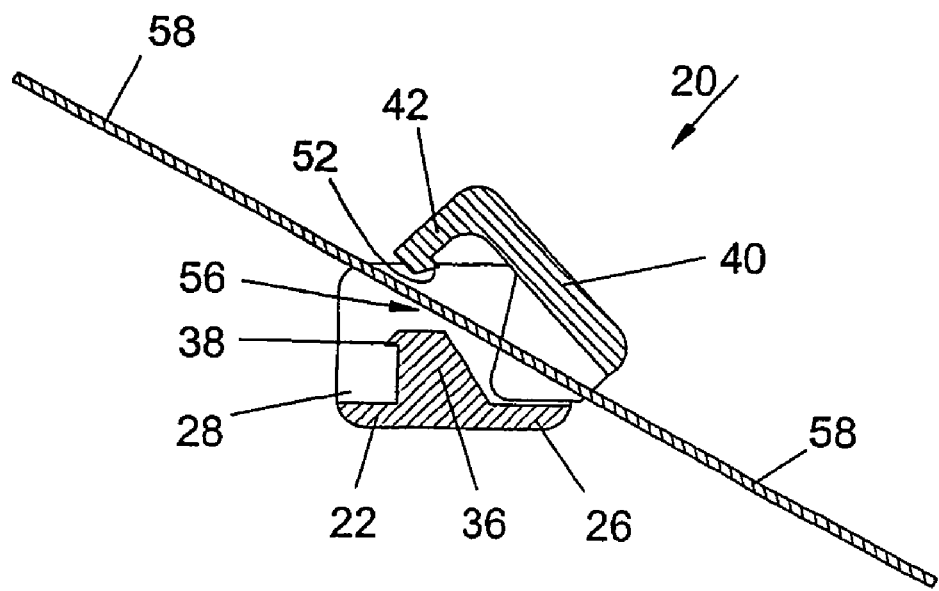
FIG. 8 a sectional side view seen along arrows VIII—VIII in FIG. 7.

Referring now to FIGS. 7 to 10, in use, the device 20 is adapted to be slidably mounted on a seatbelt 58, to a part of the seatbelt 58 that would run across a person's chest. The device 20 is mounted on the seatbelt 58 by firstly removing the gripping member 24 from the body 22. The body 22 and gripping member 24 are then located around seatbelt 58, so that the seatbelt 58 extends through the opening 56, and thereafter the gripping member 24 and body 22 are rejoined together (as shown in FIGS. 7 and 8). The pegs 48,50 slidingly cooperate with the ramps 32.1,34.1 for easy insertion into the bores 32,34.

Figure 9:
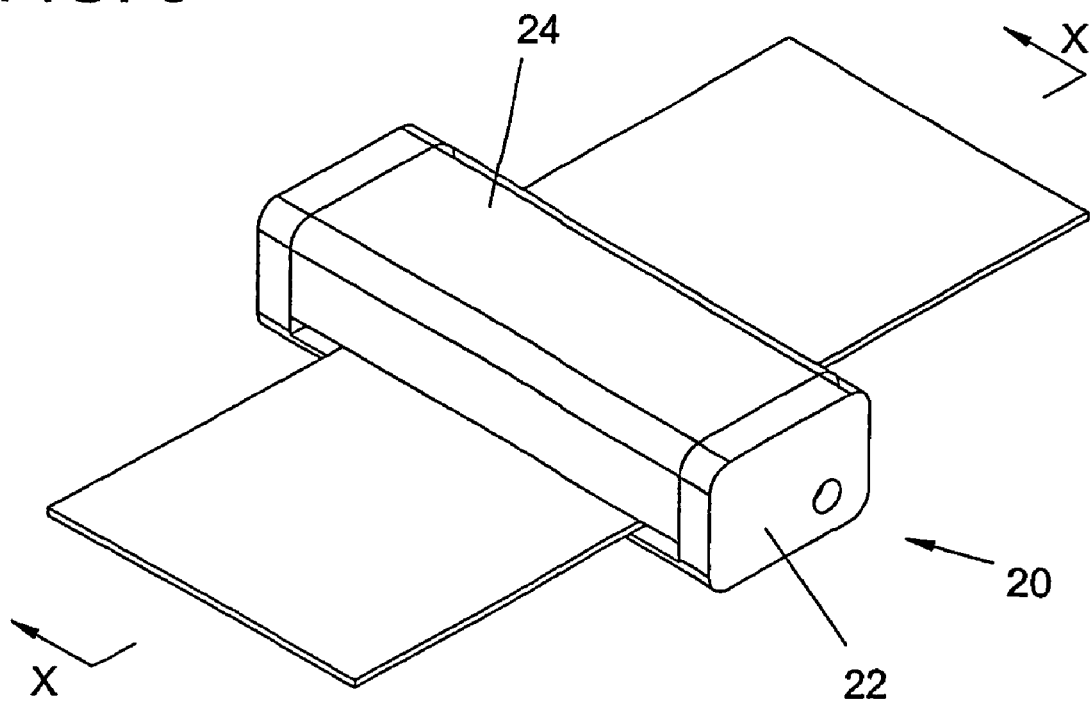
FIG. 9 a perspective view of the stop device shown provided on a seatbelt in a closed configuration.
Figure 10:
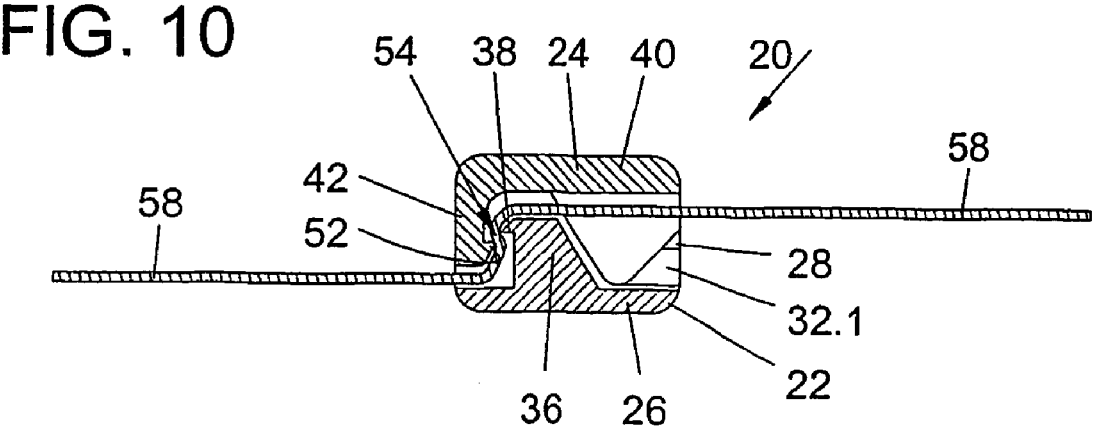
FIG. 10 a sectional side view seen along arrows X—X in FIG. 9.

Once the seatbelt 58 has been sufficiently extended from an inertia reel, the device 20 is slid up the seatbelt 58 until it abuts against a seatbelt guide or motor vehicle doorpost. The gripping member 24 is then swivelled into a closed configuration (as shown in FIGS. 9 and 10), in which the seatbelt 58 is gripped in the small opening 54 between the first lip 38 and the second lip 52.

As the device 20 is not attached to a fixed structure in a motor vehicle, the person can lean forward or otherwise extend the seatbelt 58 without releasing the stop device 20. When the person then leans back, the seatbelt 58 is only reeled in until the device 20 again abuts against the seatbelt guide or doorpost.

The device 20 can be released by tensioning the seatbelt 58 within the device 20, e.g. by pulling the seatbelt 58 sharply in a direction withdrawing it from an inertia reel. This causes the gripping member 24 to be swilled into the open configuration and allows the seatbelt 58 to be automatically rewound by the inertia reel by sliding the seatbelt 58 through the large opening 56.

The device 20 can be used on any inertia reel seatbelt 58, e.g. front or rear seat seatbelts, as it does not need to be secured to a part of a motor vehicle body.

The device 20 does not inhibit normal use of the seatbelt 58 in any way.

The device 20 can be made of any suitable material, such as plastics material, e.g. polyethylene, polypropylene, acetyl or reinforced nylon.

The device 20 can be manufactured by injection moulding.

The invention claimed is:

1. A stop device for releasably gripping an inertia reel seatbelt provided in a motor vehicle comprising:
   a) a body adapted to be spatially movable along a seatbelt, the body being movable relative to the seatbelt and the motor vehicle to which the seatbelt is fitted;
   b) a gripping member pivotally joined to the body so that an opening is formed between the body and the gripping member, which opening is adapted to receive the seatbelt, and which gripping member is adapted to be pivoted between an open configuration, in which a seatbelt is movably located in the opening, and a closed configuration, in which a seatbelt is immovably located in the opening, and further that, in use in the closed configuration the seatbelt in the opening is deformed such that the gripping member is adapted to be pivoted into the open configuration by tensioning the seatbelt within the opening; and
   c) a locking formation associated with the body and the gripping member, the locking formation having associated first and second oppositely facing locking members, the first locking member being provided on the body and the second locking member being provided on the gripping member, the first and second locking members being adapted to releasably lockingly engage the seatbelt to prevent spatial movement of the body relative to the seatbelt, while allowing spatial movement of the body relative to the motor vehicle.

2. A stop device as claimed in claim 1, which is adapted to allow further extraction or retraction of a seatbelt fitted to a motor vehicle without allowing the seatbelt from being retracted beyond a desired position at which the body is engaged to the seatbelt.

3. A stop device as claimed in claim 1, which is adapted to abut against a seatbelt guide or a doorpost of a motor vehicle, thereby preventing a seatbelt from being further retracted by an inertia reel retractor.

4. A stop device as claimed in claim 1 in which the locking formation is adapted to flex the seatbelt into an S-shape when the locking formation lockingly engages the seatbelt.

5. A stop device as claimed in claim 1, in which the locking formation is adapted to flex the seatbelt through at least 90° when the locking formation lockingly engages the seatbelt.

6. A stop device as claimed in claim 1, in which pegs are provided on the gripping member and associated bores are provided in the body, the pegs and bores being adapted to pivotally join the gripping member to the body.

7. A stop device as claimed in claim 6, in which the body is provided with ramps leading into the bores along which ramps the pegs can slide for easy insertion into the bores.

8. A stop device as claimed in claim 7, which is adapted to be relatively easily installed on an existing seatbelt by positioning the body and the gripping member on opposite sides of the seatbelt and pressing the body and gripping member together so that the pegs slidingly engage with the ramps and enter the bores.

9. A stop device as claimed in claim 1 in which the first and second locking members are triangular in side view, so that in operation a seatbelt is engaged by tooth-like ridges.

10. A stop device as claimed in claim 1 which is made of a suitable plastics material, such as polyethylene, polypropylene, acetyl or reinforced nylon.

11. A stop device as claimed in claim 1 which is manufactured of plastics material by injection moulding.

12. A safety arrangement for installation in a motor vehicle, the arrangement in combination comprising:
   a) a seatbelt withdrawably contained in a retracted condition in an inertia reel retractor, the retractor being adapted to bias the seatbelt into its retracted condition; and
   b) a stop device for releasably gripping the inertia reel seatbelt to be provided in a motor vehicle, the stop device comprising
      i) a body adapted to be spatially movable along the seatbelt, the body being movable relative to the seatbelt and the motor vehicle to which the seatbelt is fitted;
      ii) a gripping member pivotally joined to the body so that an opening is formed between the body and the gripping member, which opening is adapted to receive the seatbelt, and which gripping member is adapted to be pivoted between an open configuration, in which a seatbelt is movably located in the opening, and a closed configuration, in which a seatbelt is immovably located in the opening, and further that, in use, in the closed configuration the seatbelt in the opening is deformed such that the gripping member is adapted to be pivoted into the open configuration by tensioning the seatbelt within the opening; and
      iii) a locking formation associated with the body and the gripping member, the locking formation having associated first and second oppositely facing locking members, the first locking member being provided on the body and the second locking member being provided on the gripping member, the first and second locking members being adapted to releasably lockingly engage the seatbelt to prevent spatial movement of the body relative to the seatbelt, while allowing spatial movement of the body relative to the motor vehicle.

13. A method of controlling retraction of an inertia reel seatbelt provided in a motor vehicle comprising the steps of:
   providing regulation means slidably mounted on the seatbelt;
   extracting the seatbelt to a length of suitable extent;
   lockingly engaging the regulation means against the seatbelt to prevent the seatbelt from being retracted to a length less than the suitable extent, while allowing further extraction or retraction of the seatbelt to a length greater than the suitable extent, wherein the seatbelt is deformed by the regulation means when lockingly engaged; and, when required, of releasing the regulation means to allow complete retraction of the seatbelt by tensioning the seatbelt within the regulation means in order to straighten the seatbelt and to release the regulation means.

14. A method as claimed in claim 13, in which the regulation means is a stop device for releasably gripping the inertia reel seatbelt provided in a motor vehicle, the stop device comprising:
   a) a body adapted to be spatially movable along the seatbelt, the body being movable relative to the seatbelt and the motor vehicle to which the seatbelt is fitted;
   b) a gripping member pivotally joined to the body so that an opening is formed between the body and the gripping member, which opening is adapted to receive the seatbelt, and which gripping member is adapted to be pivoted between an open configuration, in which a seatbelt is movably located in the opening, and a closed configuration, in which a seatbelt is immovably located in the opening, and further that the gripping member is adapted to be pivoted into the open configuration by tensioning the seatbelt within the opening; and c) a locking formation associated with the body and the gripping member, the locking formation having associated first and second oppositely facing locking members, the first locking member being provided on the body and the second locking member being provided on the gripping member, the first and second locking members being adapted to releasably lockingly engage the seatbelt to prevent spatial movement of the body relative to the seatbelt, while allowing spatial movement of the body relative to the motor vehicle.

15. A method as claimed in claim 14, in which the stop device is installed on a seatbelt by positioning the body and the gripping member on opposite sides of the seatbelt and pressing the body and gripping member together to pivotally join the gripping member to the body.

16. A method as claimed in claim 15, in which the gripping member is pivoted to cause the locking formation to lockingly engage with the seatbelt and in which the seatbelt is tensioned within the stop device to disengage the locking formation from the seatbelt.

* * * * *